United States Patent [19]

Hungerford, Jr.

[11] Patent Number: 4,662,590
[45] Date of Patent: May 5, 1987

[54] CONNECTOR DEVICE FOR SUPPORTING A CONDUCT IN A FLANGED CHANNEL

[76] Inventor: Charles S. Hungerford, Jr., 6 Beechwood Ct., Woodbury, Conn. 06798

[21] Appl. No.: 859,332

[22] Filed: May 5, 1986

[51] Int. Cl.⁴ .............................................. F16L 3/24
[52] U.S. Cl. ...................................... 248/72; 248/73; 403/248; 403/353
[58] Field of Search ................ 248/72, 73, 74.1, 317; 403/248, 249, 254, 405.1, 353; 52/39

[56] References Cited

U.S. PATENT DOCUMENTS

| | | | |
|---|---|---|---|
| 3,443,783 | 5/1969 | Fisher | 403/353 X |
| 3,486,726 | 12/1969 | Kindorf et al. | 248/72 |
| 3,778,537 | 12/1973 | Miller | 248/72 |
| 4,157,800 | 6/1979 | Senter et al. | 248/73 X |
| 4,291,855 | 9/1981 | Schenkel et al. | 24/339 X |
| 4,542,871 | 9/1985 | Fortsch | 248/73 |

Primary Examiner—Ramon O. Ramirez
Attorney, Agent, or Firm—Bachman & LaPointe

[57] ABSTRACT

A quick operating connector assembly for securing a cable or conduit to a support channel. The device having a central post supporting two sets of opposed parallel locking lungs extending from the post. The post is formed with a slit and a bore intersecting the slit, such that a fastener means received in advance into the bore would effectively open the slit.

12 Claims, 7 Drawing Figures

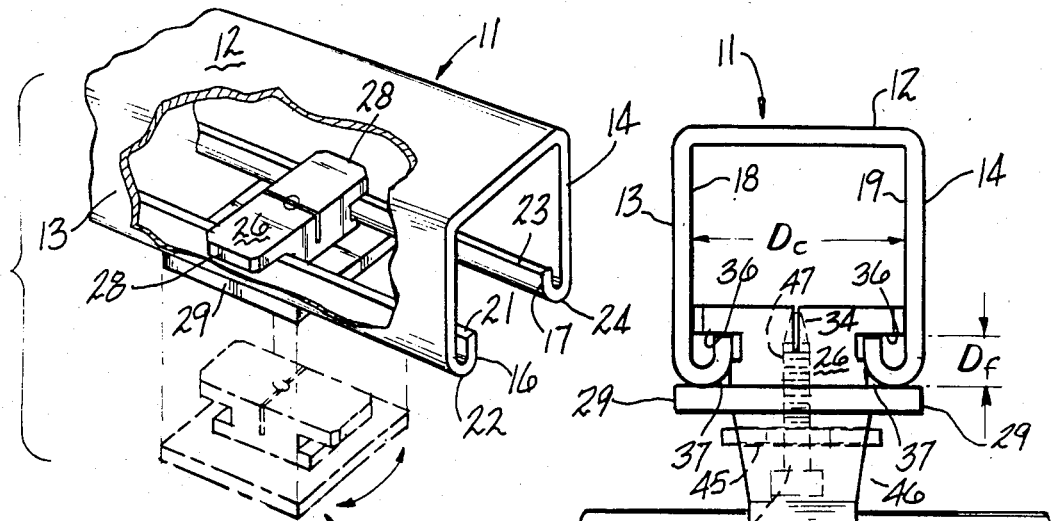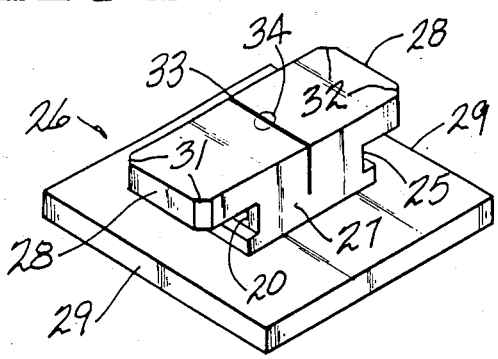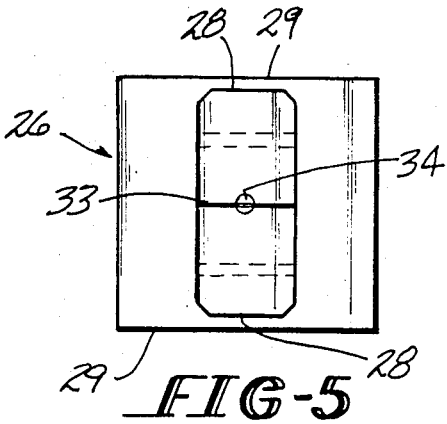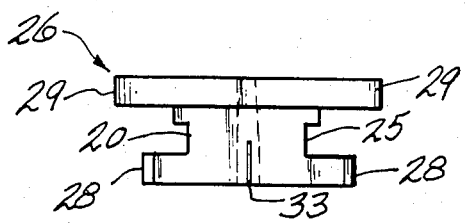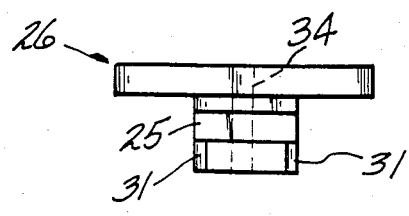

CONNECTOR DEVICE FOR SUPPORTING A CONDUCT IN A FLANGED CHANNEL

FIELD OF THE INVENTION

The present invention relates to connector devices and in particular to such devices useful to make a releasable connection between a channel member and a cable or conduit support.

BACKGROUND OF THE INVENTION

The prior art is replete with clips, straps, and the like for securing cables, pipes and other conduits to the classic construction channel member.

Representative examples of the classic channel member are disclosed and described in U.S. Pat. Nos. 4,157,800 to Senter et al. and 4,542,871 to Fortsch, identified by the reference numeral 24 in 4,157,800 and by the reference numeral 14 in the 4,542,871.

A commercial conduit support or pipe clamp is disclosed and described in U.S. Pat. No. 4,291,855 to Schenkel et al.

The present invention deals with a quick operating releasable connector device for effecting a connection between the classic channel member and a conduit support.

While it is not intended that the present invention be so limited, it is especially useful in making a connector between the pipe or conduit clamp of U.S. Pat. No. 855 and the classic channel members.

The invention also involves a novel combination, according to several permutations, of a channel member, a connector device and a conduit support including the connector device, per se.

Consequently it is a particular feature of the present invention to provide a novel connector device in the above described environment.

A further feature of the invention is the provision of a connector device structure which when combined with a clamp of the structure disclosed in U.S. Pat. No. 4,291,855 results in a very secure but releasable, quick operating connection to a channel member.

A further feature of the invention is the provision of a connector device operable to engage a channel member where the connector is formed (molded) integrally with a conduit support to form a unitary, single piece part.

A representative embodiment of the connector device of the invention may comprise a unitary generally solid plastic element, said element having a central post, said post supporting two sets of opposed locking lugs, the lugs of a first set being offset from the lugs of a second set a predetermined distance, said sets of lugs being disposed in a generally parallel relationship and each lug of said first set of lugs terminating in a chamfered or bevelled periphery to facilitate a jamming action when the element is manipulated relative to a channel member.

An assembly including a channel member, conduit support and connector device in combination may comprise a channel member of indeterminate length having opposed flanges, each flange having opposed bearing surfaces spaced apart a predetermined distance, a conduit support and a connector device for securing the conduit support to the channel member releasably, said connector device having a solid central post supporting two sets of opposed locking lugs, the lugs of a first set being offset from the lugs of the second set a distance equal to said predetermined distance whereby said lugs are operable to engage and straddle said opposed flanges.

A combined connector device and conduit clamp may comprise a unitary single piece part molded of suitable plastic material.

Other features and advantages of the present invention will become more apparent from an examination of the succeeding specification when read in conjunction with the appended drawings, in which:

BRIEF DESCRIPTION OF THE DRAWINGS

FIG. 1 is an exploded perspective view of the connector device poised for insertion and in place in the channel member.

FIG. 2 is a side elevation, partially in section, showing the connector device assembled to a channel member and supporting a conduit of the type disclosed in U.S. Pat. No. 4,291,855.

FIG. 3 is a perspective view of the connector device, per se.

FIG. 4 is a view of the bottom side of the disclosure of FIG. 3.

FIG. 5 is a plan view of the top side of the connector device.

FIG. 6 is a side view of the illustration of FIG. 4 as observed in the direction of the arrows.

FIG. 7 is a side elevation of the right side of FIG. 6.

DETAILED DESCRIPTION OF THE PREFERRED EMBODIMENTS

Referring now in detail to the drawings the reference numeral 11 designates a channel member of indeterminate length having a top wall 12, spaced sidewalls 13 and 14 each terminating in return bend portions defining flanges 16 and 17.

The channel member sidewalls 13 and 14 have interior surfaces 18 and 19 spaced apart by a predetermined dimension $D_c$.

The flanges have opposed bearing surfaces 21-22 and 23-24, respectively spaced apart a distance $D_f$.

A connector device indicated generally by the reference numeral 26 includes a central post 27 supporting two sets of opposed locking lugs 28—28 and 29—29 offset from one another by a distance generally equal to dimension $D_f$ (see FIG. 2).

A first set of lugs 28—28 terminate in a chamfered or bevelled periphery as indicated at 31 and 32.

Post 27, undercut as indicated at 20 and 25, is formed with a slit 33 intersected by a cylindrical or tapered bore 34.

The locking lugs 28 and 29 are formed with planar generally parallel bearing surfaces 36 and 37 and the total area of the bearing surfaces 36 (locking lugs 28—28) is substantially less than the total area of the bearing surfaces 37 (locking lugs 29—29).

The reference numeral 41 designates a conduit support in the form of a pipe clamp of the type disclosed in said U.S. Pat. No. 4,291,855 and includes a bight 42 surrounding a pipe or conduit 43, a latch 44, and a plate 46 received in a through slot 45 supporting a fastener means such as a screw 47. The screw 47 is received into bore 34 of connector device 26 connecting the conduit support 41 to the connector device.

Alternatively, the slot 45 and the plate 46 can be eliminated so that a screw received in counterbored opening 50 is threaded directly into bore 34.

As stated previously the conduit support 41 of the U.S. Pat. No. 4,291,855 is merely exemplary of an operative commercially successful unit; it is not intended that the invention, in the various combinations claimed, be limited to the structure in U.S. Pat No. 4,291,855.

For example, it is entirely within the spirit and scope of the invention that a conduit support be formed (molded) integrally with a connector device forming a single piece part with an appropriate quick release latch in the conduit support portion for engaging and releasing a conduit.

OPERATION

Assume that the connector device 26 is in the exploded position of FIG. 1.

From this point the device is moved manually into the open end of the channel member 11 until the locking lugs 29—29 (second set) contact flanges 16-17.

Next the connector device is rotated clockwise or counterclockwise relative to the channel member to the assembled position of FIGS. 1 and 2.

Note that this rotating step is eased and facilitated by the chamfered periphery of the opposed lugs 28—28 (first set).

The bearing surfaces of the respective sets of locking lugs mate snugly with the cooperating bearing surfaces of the flanges 16 and 17 as the locking lugs straddle the flanges.

In addition, the overall length of the opposed lugs 28—28 is substantially equivalent to the channel dimension $D_c$ creating a jamming action in the invention of the channel.

Next the conduit support 41 is secured to the connector device by advancing screw 47 into bore 34. This step enhances the jamming action in that the screw spreads slit 33 swelling post 27 and separating lugs 28,28 causing them to bear very tightly and under compressive stress against the interior surfaces of the chamber member sidewalls.

Post undercuts 20,25 enhance the spreading of the slit by providing a hinge effect.

Where the conduit support is molded integrally with the connector device obviously there is no need for the screw and plate elements.

It is understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A quick operating connector device for facilitating a connection between a channel member and a conduit support comprising:
    a unitary generally solid element, said element having a central post, said post supporting two sets of opposed locking lugs extending from said post along a first plane, the lugs of a first set being offset from the lugs of a second set a predetermined distance so as to provide a plurality of openings, said sets of lugs being disposed in a generally parallel relationship and each lug of said first set of lugs terminating in a chamfered periphery and a slit formed in said central post and extending along a second plane different from said first plane and a bore provided in said central post, said bore intersecting the slit such that a fastener means received in advance into said bore is effective to open the slit.

2. The connector device of claim 1 in which the post and said first set of lugs define a T-shaped configuration.

3. The connector device of claim 2 in which the post is formed with opposed undercuts positioned parallel to said slit to facilitate further said jamming action.

4. The connector device of claim 1 in which each set of locking lugs is formed with opposed, planar bearing surfaces and the area of the bearing surface of the second set of lugs is substantially greater than the area of the bearing surface of the first set of lugs.

5. In combination, a channel member of indeterminate length and a connector device, said channel member having a top wall contiguous with two sidewalls, each sidewall terminating in a return bend portion defining a flange having spaced bearing surfaces, said connector device comprises a solid element having a central post, said post supporting two sets of opposed locking lugs extending from said post along a first plane, the lugs of a first set being offset from the lugs of a second set a predetermined distance so as to define a plurality of openings, said sets of lugs being disposed in a generally parallel relationship and each lug of said first set of lugs terminating in a chamfered periphery to facilitate a jamming action of said first set of lugs on the inside surface of said channel member when the element is manipulated relative to said channel member such that the return bend portion of said channel member is held captive in said plurality of openings defined by said two sets of opposed locking lugs.

6. The combination of claim 5 in which each set of locking lugs is formed with generally planar bearing surfaces mating with said spaced bearing surfaces of said flange.

7. The combination of claim 6 in which the total area of the bearing surface of one set of locking lugs is substantially greater than the total area of the bearing surface of the other set of locking lugs.

8. The combination of claim 7 in which the sidewalls have internal surfaces spaced apart a distance generally equal to the combined length of the set of locking lugs having the smaller total bearing surface area.

9. The combination of claim 5 wherein the central post of the connector device is formed with a slit extending along a second plane different from said first plane and a bore extending along a third plane different from said first plane and said second plane, said bore intersecting the slit so that a fastening means received in advance into the bore is effective to open the slit so as to bias the lugs of the first set against the inside of the channel member thereby intensifying the jamming action.

10. In combination a channel member of indeterminate length having opposed flanges, each flange having opposed bearing surfaces spaced apart a predetermined distance, a conduit support and a connector device for securing the conduit support to the channel member releasably, said connector device having a solid central post supporting two sets of opposed locking lugs, the lugs of a first set being offset from the lugs of the second set a distance equal to said predetermined distance whereby said lugs are operable to engage and straddle said opposed flanges, said central post having a slit and a bore intersecting said slit and fastening means received in said bore for securing said conduit support to said connector device wherein the position of the conduit support is rotatable 360° so as to selectively rotate the position of the conduit support relative to the channel member.

11. The combination of claim 10 in which the post is formed with a slit and a bore intersecting said slit and said conduit support includes a fastener means operable to be received in said bore to secure said support to the connector device, said fastener means being further operable to open the slit to move one set of lugs into snug, frictional contact with said channel member.

12. The combination of claim 10 in which the connector device and the conduit support define a single unitary plastic piece part.

* * * * *

UNITED STATES PATENT AND TRADEMARK OFFICE
CERTIFICATE OF CORRECTION

PATENT NO. : 4,662,590
DATED : May 5, 1987
INVENTOR(S) : CHARLES S. HUNGERFORD JR.

It is certified that error appears in the above-identified patent and that said Letters Patent is hereby corrected as shown below:

On the Cover Page, in the Title, the word "CONDUCT" should read --CONDUIT--.

On the Cover Page, in the Abstract, line 6, change "in advance" to read --and advanced--.

In Column 4, claim 1, line 2, change "in advance" to read --and advanced--.

In Column 4, claim 9, lines 50-51, change "in advance" to read --and advanced--.

Signed and Sealed this

Twenty-fifth Day of August, 1987

Attest:

DONALD J. QUIGG

*Attesting Officer*  *Commissioner of Patents and Trademarks*